United States Patent [19]
Lee et al.

[11] Patent Number: 5,933,402
[45] Date of Patent: *Aug. 3, 1999

[54] OPTICAL PICKUP CAPABLE OF COMPATIBLY ADOPTING DISKS OF DIFFERENT THICKNESS

[75] Inventors: Moon-gyu Lee; Hyun-kuk Shin; Yu-shin Yi, all of Suwon, Rep. of Korea

[73] Assignee: Samsung Electronics Co., Ltd., Kyungki-Do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,204

[22] Filed: May 15, 1997

[30] Foreign Application Priority Data

May 15, 1996 [KR] Rep. of Korea ............ 96-16243

[51] Int. Cl.$^6$ .................................................. G11B 7/00
[52] U.S. Cl. .................................... 369/121; 369/112
[58] Field of Search ................................ 369/112, 44.12, 369/44.23, 44.24, 44.37, 120, 121, 109, 110; 372/92, 96, 50

[56] References Cited

U.S. PATENT DOCUMENTS

| | | | |
|---|---|---|---|
| 5,235,581 | 8/1993 | Miyagawa et al. | 369/112 |
| 5,483,511 | 1/1996 | Jewell et al. | 369/44.23 |
| 5,513,204 | 4/1996 | Jayaraman | 372/96 |
| 5,526,338 | 6/1996 | Hasman et al. | 369/112 |
| 5,615,200 | 3/1997 | Hoshino et al. | 369/44.37 |
| 5,625,617 | 4/1997 | Hopkins et al. | 369/44.12 |
| 5,627,814 | 5/1997 | Lee | 369/44.37 |
| 5,663,944 | 9/1997 | Mun | 369/121 |
| 5,680,384 | 10/1997 | Seki et al. | 369/44.12 |
| 5,696,749 | 12/1997 | Brazas, Jr. et al. | 369/112 |
| 5,696,750 | 12/1997 | Katayama | 369/109 |
| 5,703,856 | 12/1997 | Hayashi et al. | 369/112 |
| 5,717,674 | 2/1998 | Mori et al. | 369/103 |
| 5,732,101 | 3/1998 | Shin | 372/92 |
| 5,745,465 | 4/1998 | Tsai et al. | 369/112 |
| 5,757,741 | 5/1998 | Jiang et al. | 369/121 |
| 5,815,482 | 9/1998 | Rope et al. | 369/44.14 |
| 5,831,960 | 11/1998 | Jiang et al. | 369/121 |

*Primary Examiner*—Nabil Hindi
*Attorney, Agent, or Firm*—Sughrue, Mion, Zinn, Macpeak & Seas, PLLC

[57] ABSTRACT

An optical pickup includes at least two vertical cavity surface emitting lasers (VCSEL) disposed adjacent to each other on the same substrate for emitting light having different emission angles, a light path converter for converting the travel path of incident light, an objective lens for focusing incident light to form an optical spot on an optical recording medium, and an optical detector for receiving light which is reflected by the optical recording medium and passed through the objective lens and the light path converter. The optical pickup selectively drives one of the VCSELs so that disks of different thicknesses can be compatibly adopted, and high efficiency of light can be secured.

6 Claims, 3 Drawing Sheets

OPTICAL PICKUP CAPABLE OF COMPATIBLY ADOPTING DISKS OF DIFFERENT THICKNESS

BACKGROUND OF THE INVENTION

The present invention relates to an optical pickup capable of compatibly adopting disks of different thickness, and more particularly, to an optical pickup by which optical efficiency is improved by the adoption of at least two light sources.

A digital video disk player (hereinafter, called DVDP) should be capable of recording and reproducing information of not only a digital video disk (DVD) but also a compact disk (CD).

The standardized thickness of the DVD is 0.6 mm which is thinner than the standard thickness of the CD or CD-ROM of 1.2 mm. Since the standard thicknesses of the DVD and CD are different from each other, spherical aberrations are generated due to a difference in thickness when an optical pickup for a DVD reproduces information recorded on a CD, which makes information reproduction difficult.

To account for such problem, a conventional optical pickup which can read both a CD and a DVD has been devised, as shown in FIG. 1. The optical pickup shown in FIG. 1 includes an optical source 11 for producing and emitting laser light, an objective lens 19 for focusing incident light so that an optical spot is formed on the recording surface of an optical disk 30, a beam splitter 15 for changing the travel path of the incident light, and a hologram element 17 and an optical detector 23. The beam splitter 15 is positioned on a light path between the optical source 11 and the objective lens 19, and reflects most of the light received from the optical source 11 and passes most of the light reflected by the optical disk 30 toward the optical detector 23. The hologram element 17 is situated on a light path between the objective lens 19 and the beam splitter 15, and segregates light received from the optical source 11 into 0-order light 3 and +1-order light 5. The 0-order light 3 continues in the same direction as the incident light for the most part, and the +1-order light 5 diverges after passing through the hologram element 17. Thus, the 0-order and +1-order light 3 and 5 pass through different portions of the objective lens 19 and are focused at different positions. Here, the 0-order light 3 is used to record and reproduce information on the DVD, and the +1-order light 5 is used to record and reproduce information on the CD.

The optical detector 23 is comprised of a plurality of plates (not shown) each receiving light independently. Signals detected by the optical detector 23 are summed and/or subtracted, and the results are amplified to be outputted as an information signal (Radio Frequency), a tracking error signal and a focus error signal.

Also, the optical pickup further includes a grating 13 installed between the optical source 11 and the beam splitter 15 for diffracting the incident beam into 0-order diffracted beam and +1-order diffracted beam, and a collimating lens 16 installed between the beam splitter 15 and the hologram element 17 for changing emanated incident light into parallel light. Also, an astigmatism lens 21 installed between the beam splitter 15 and the optical detector 23 has a semicylinder shape in general. When the distance between the objective lens 19 and the optical disk 30 corresponds to an on-focus state, the astigmatism lens 21 allows a circular light to be formed on the optical detector 23, otherwise, it allows an elliptical light to be formed thereon.

The conventional optical pickup having such a configuration selectively employs the 0-order and +1-order light 3 and 5 diffracted in the hologram 17, so that the optical efficiency of a light spot formed on the optical disk 30 is degraded to less than 50%. Furthermore, light which is reflected by the optical disk 30 and proceeds toward the optical detector 23 via the hologram 17 has an efficiency of not more than 25%.

SUMMARY OF THE INVENTION

It is an object of the present invention to provide an optical pickup, which can be compatibly used for disks of different thicknesses, whereby light efficiency is improved by the use of at least two optical sources.

To accomplish the above object, there is provided an optical pickup comprising: an optical source comprising at least two surface emitting lasers installed adjacent to each other on one substrate for emitting light having different emission angles; an objective lens for focusing light emitted from the optical source on an optical recording medium; light path converting means for converting the traveling path of light reflected by the optical recording medium; and an optical detector for receiving light which is reflected by said optical recording medium and passed through the light path converting means.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
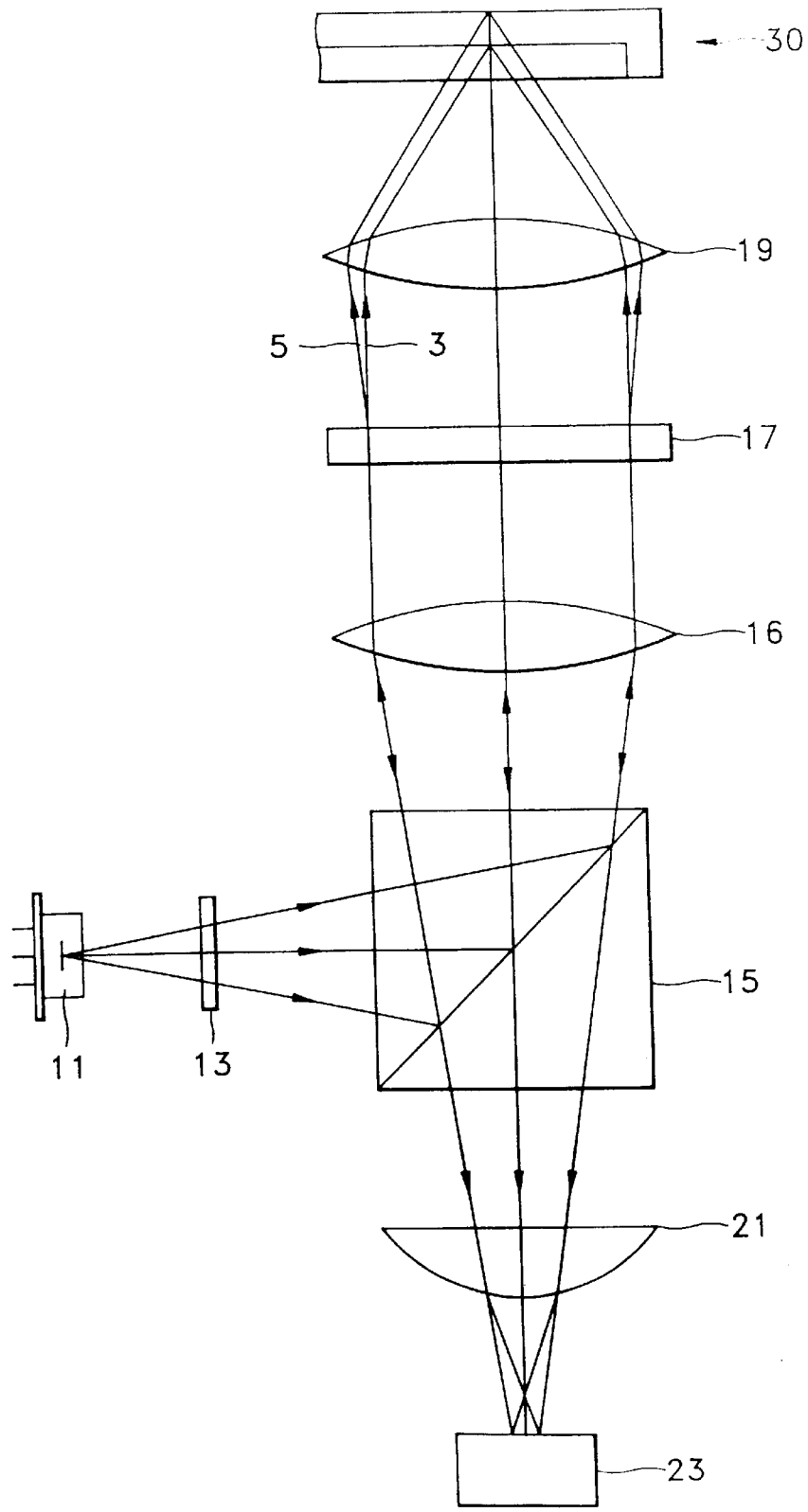
FIG. 1 is a schematic diagram showing the optical arrangement of a conventional CD/DVD compatible optical pickup.
Figure 2:
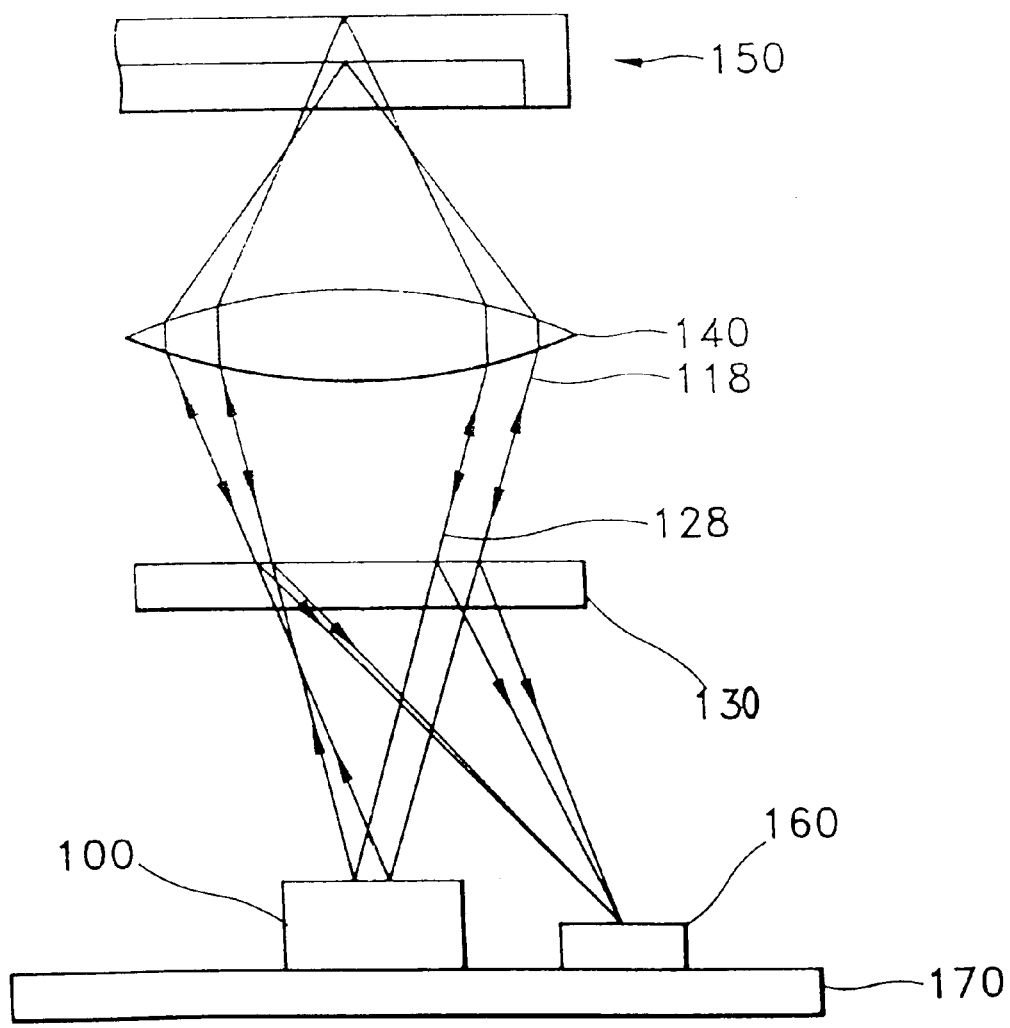
FIG. 2 shows the optical arrangement of an optical pickup capable of reading disks of different thicknesses according to the present invention.

Referring to FIG. 2, an optical pickup capable of reading disks of different thicknesses according to the present invention includes an optical source 100, a light path converting means 130 for changing the proceeding path of incident light, an objective lens 140 for focusing light incident from the optical source 100 to form an optical spot on an optical disk 150, and an optical detector 160 for receiving light which is reflected by the optical disk 150 and passed through the light path converting means 130 and detecting information and error signals.

In contrast with an edge emitting laser, a vertical cavity surface emitting laser (VCSEL) emits light in the stacking direction. Thus, the arrangement of a twodimensional array structure is simple.

Figure 3:
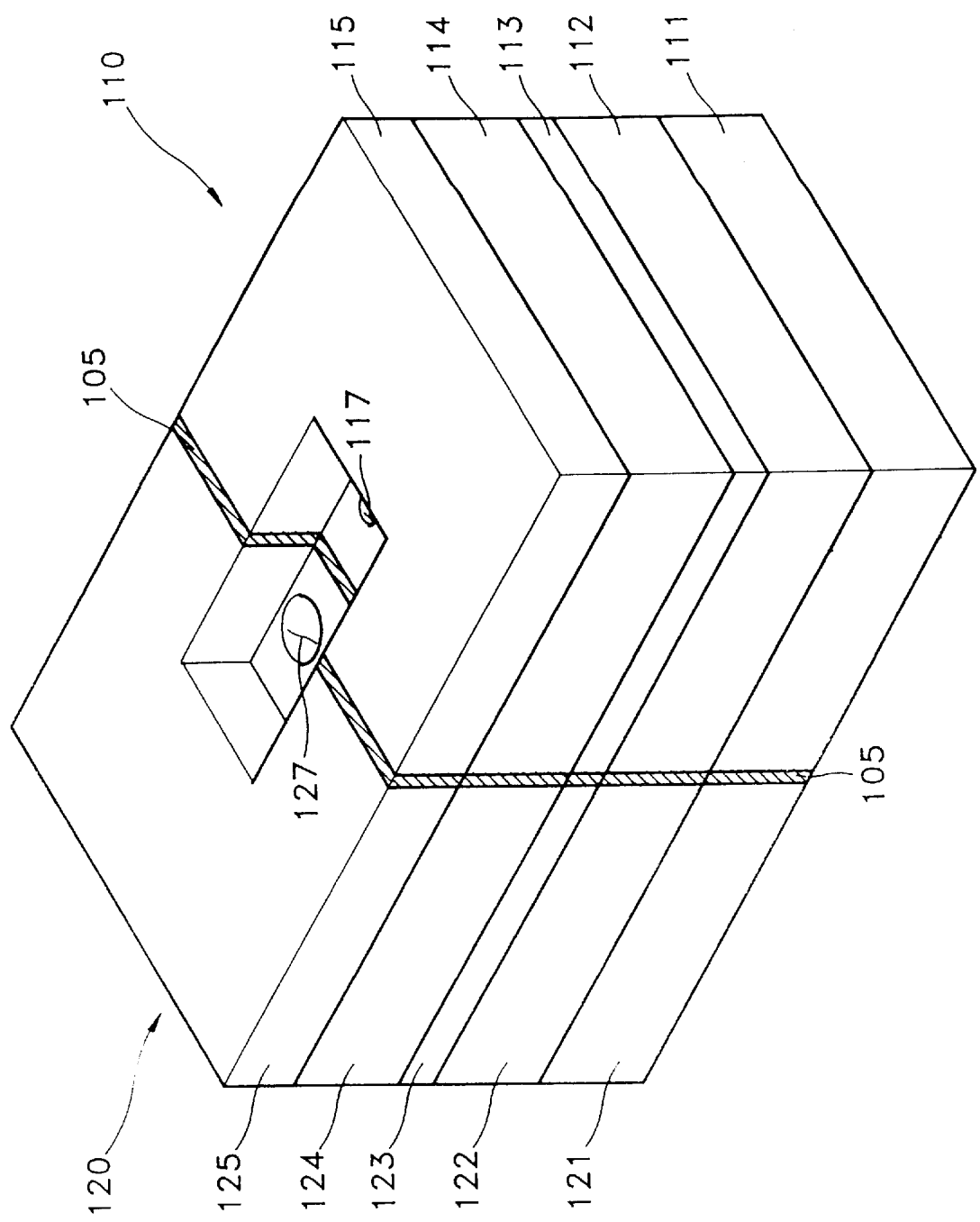
FIG. 3 is a schematic perspective view of the optical source in the optical pickup of FIG. 2.

As shown in FIG. 3, the optical source 100 includes first and second VCSEL 110 and 120 disposed adjacent to each other on the substrate 170 of FIG. 2 by taking advantage of the characteristics of the VCSEL.

The first VCSEL 110 emits light at a larger emission angle than the second VCSEL 120 to be appropriate for a relatively thin disk, e.g., the DVD. The second VCSEL 120 emits light at a relatively small emission angle to be appropriate for a relatively thick disk, e.g., the CD. Since the distance between the light emitting portions of the two VCSELs 110 and 120 is within tens of micrometers ($\mu$m), deviation from an optical axis caused by the emission of light at different positions is negligible.

The first VCSEL 110 is comprised of a first lower electrode layer 111 and a first lower reflector layer 112, a first active layer 113, a first upper reflector layer 114 and a first upper electrode layer 115 which are sequentially stacked from the first lower electrode layer 111. A first emitting window 117 for emitting light which is produced in the first active layer 113 and passed through the first upper reflector layer 114 is formed on the first upper electrode layer 115. Here, the emission angle of light emitted is inversely proportional to the diameter of the first emitting window 117.

The respective first lower and upper reflector layers 112 and 114 are comprised of a multitude of alternating layers of a semiconductor compound of $Al_xGa_{l-x}As$ containing impurities and a compound of GaAs. However, the respective first lower and upper reflector layers 112 and 114 are formed of different types of impurity-contained semiconductors. For example, the first lower reflector layer 112 is an n-type semiconductor, and the first upper reflector layer 114 is a p-type semiconductor. Alternatively, the opposite case is possible.

Each of the respective first lower and upper reflector layers 112 and 114 has a high reflectivity of 99% or more, and reflects most of the light produced by the first active layer 113 and passes a very small part of the light therethrough.

The respective first upper and lower electrode layers 115 and 111 are made of a metal having excellent electrical conductivity. A positive voltage with respect to the first lower electrode layer 111 is applied from an external electrical source (not shown) to the first upper electrode layer 115.

The second VCSEL 120 comprises a second lower electrode layer 121, and a second lower reflector layer 122, a second active layer 123, a second upper reflector layer 124 and a second upper electrode layer 125 which are sequentially stacked from the second layer electrode layer 121. A second emitting window 127 is formed on the second upper electrode layer 125. Here, the structure of the respective layers constituting the second VCSEL 120 is the same as that of corresponding layers of the first VCSEL 110. Also, the first and second VCSELs 110 and 120 are manufactured in the same manner, and are electrically insulated from each other by a blocking plate 105 formed therebetween.

The diameter of the first emitting window 117 is smaller than that of the second emitting window 127 so that the emission angle of light emitted from the first emitting window 117 is larger than that of light emitted from the second emitting window 127.

In the optical source 100 having such a structure, the first VCSEL 110 or the second VCSEL 120 can irradiate light, depending on the thickness of the selected optical disk 150 of FIG. 2. Alternatively, the optical source 100 can be comprised of a plurality of VCSELs formed adjacent to one another, and can make the emission angles of light emitted by each VCSEL different.

A hologram can be employed as the light path converting means 130 of FIG. 2 for changing the traveling path of incident light. In this case, the hologram forms a hologram pattern on at least one surface, and passes light incident from the optical source 100 straight toward the optical disk 150, and diffractingly passes light incident from the objective lens 140 toward the optical detector 160. Also, a well-known half mirror (not shown) or a polarizing beam splitter (not shown) can be adopted as the light path converting means 130.

Light emitted at different emission angles from the optical source 100 is focused by the objective lens 140 so that an optical spot is formed at different positions. That is, the objective lens 140 focuses light 118 emitted from the first VCSEL 110 of FIG. 3 on the recording surface of a thin optical disk, and focuses light 128 emitted from the second VCSEL 120 of FIG. 3 on the recording surface of a relatively thick optical disk.

The optical detector 160 receives light which is reflected by the optical disk 150 and passes through the objective lens 140 and the light path converting means 130. When the hologram is employed as the light path converting means 130, the optical detector 160 can be disposed together with the optical source 100 adjacent to each other on the same substrate 170. Since the optical detector 160 corresponds to a plate adopted in a typical optical pickup, a detailed description thereof will be omitted.

The optical pickup according to the present invention arranges at least two VCSELs for emitting light having different emission angles in an array form and selectively emits light, whereby information can be recorded and reproduced on optical disks of different thickness with a high efficiency being secured.

While the invention has been described with reference to a preferred embodiment, it should be apparent to those skilled in the art that many changes and modifications may be made without departing from the spirit and scope of the invention as defined in the claims.

What is claimed is:

1. An optical pickup for different types of optical recording mediums having differing thicknesses, comprising:

an optical source having at least two vertical cavity surface emitting lasers (VCSELs) installed adjacent to each other on a substrate for emitting light having different emission angles, for recording and reproducing information of different types of optical recording mediums having a variety of predetermined thicknesses;

an objective lens for focusing the light emitted from said optical source on the optical recording medium;

light path converting means for converting a traveling path of the light which is reflected by the optical recording medium; and an optical detector for receiving the light which is reflected by the optical recording medium and passed through said light path converting means.

2. An optical pickup as claimed in claim 1, further comprising a blocking plate formed between said VCSELs for mutually insulating said VCSELs.

3. An optical pickup as claimed in claim 1, wherein said VCSEL comprises a lower electrode layer and a lower reflector layer, an active layer, an upper reflector layer and an upper electrode layer which are sequentially formed on said lower electrode layer, and wherein an emitting window through which a laser produced in said active layer is emitted is formed on said upper electrode layer.

4. An optical pickup as claimed in claim 3, wherein a positive voltage with respect to said lower electrode layer is applied to said upper electrode layer.

5. An optical pickup as claimed in claim 1, wherein said light path converting means is an optical element having a surface facing said optical source and a surface facing said objective lens and includes a hologram pattern on at least one of said surfaces.

6. An optical pickup as claimed in claim 1, wherein said optical detector is disposed together with said optical source adjacent to each other on the substrate.

* * * * *